United States Patent [19]
Branham et al.

[11] 3,747,402
[45] July 24, 1973

[54] ARRANGEMENT FOR MEASURING THE LOAD ON A HOOK CARRIED BY A TRAVELING BLOCK WHICH IS SUPPORTED FROM THE CROWN BLOCK OF A DRILLING MAST

[75] Inventors: Donald R. Branham; Paul E. Borg, both of Houston, Tex.

[73] Assignee: Pyramid Derrick & Equipment Corp., Houston, Tex.

[22] Filed: May 12, 1972

[21] Appl. No.: 252,904

[52] U.S. Cl. .......................... 73/151, 177/147, 212/2
[51] Int. Cl. .................. G01g 19/14, B66c 13/16
[58] Field of Search .................... 73/143, 144, 151; 177/147; 212/2

[56] References Cited
UNITED STATES PATENTS

| | | | |
|---|---|---|---|
| 1,183,646 | 5/1916 | Hughes | 177/147 X |
| 1,459,102 | 6/1923 | Hughes | 177/147 |
| 2,349,228 | 5/1944 | Wolff | 73/151 |
| 2,656,719 | 10/1953 | Webber | 73/151 X |
| 2,758,472 | 8/1956 | Bowen, Jr. | 73/144 |

*Primary Examiner*—Charles A. Ruehl
*Attorney*—Jack W. Hayden

[57] ABSTRACT

Spaced cluster of sheaves are rotatably carried on a shaft to form a gap adjacent the central portion of the shaft, and a generally U-shaped frame supports a sheave in elevated relation between the clusters and in the gap. One part of the frame forming the first upwardly extending frame member is pivotally supported at its lower end and a second upwardly extending frame member is formed by two legs connected at their lower ends which diverge from such connection toward their upper ends and is adapted to engage a pressure responsive load cell means positioned therebeneath. Means are provided for limiting the vertical and lateral movement of the second upwardly extending frame member relative to the pressure responsive load cell means, and a flexible line is reeved over a fast line sheave and then over the sheave in one of the clusters and then down to the traveling block and thence back and forth between the sheaves in one cluster and the traveling block and then upwardly over the elevated sheave in the gap between the clusters and then down to the traveling block and thence back and forth between the sheaves in the second cluster and is then secured at its end in the mast. When a load is carried by the hook, this is transmitted by the flexible line from the traveling block to the cluster of sheaves including the elevated sheave which exerts a pressure upon the pressure responsive load cell means. This functions as a transducer and supplies an indication to suitable gauge or indicator means for indicating the load on the hook carried by the traveling block.

4 Claims, 4 Drawing Figures

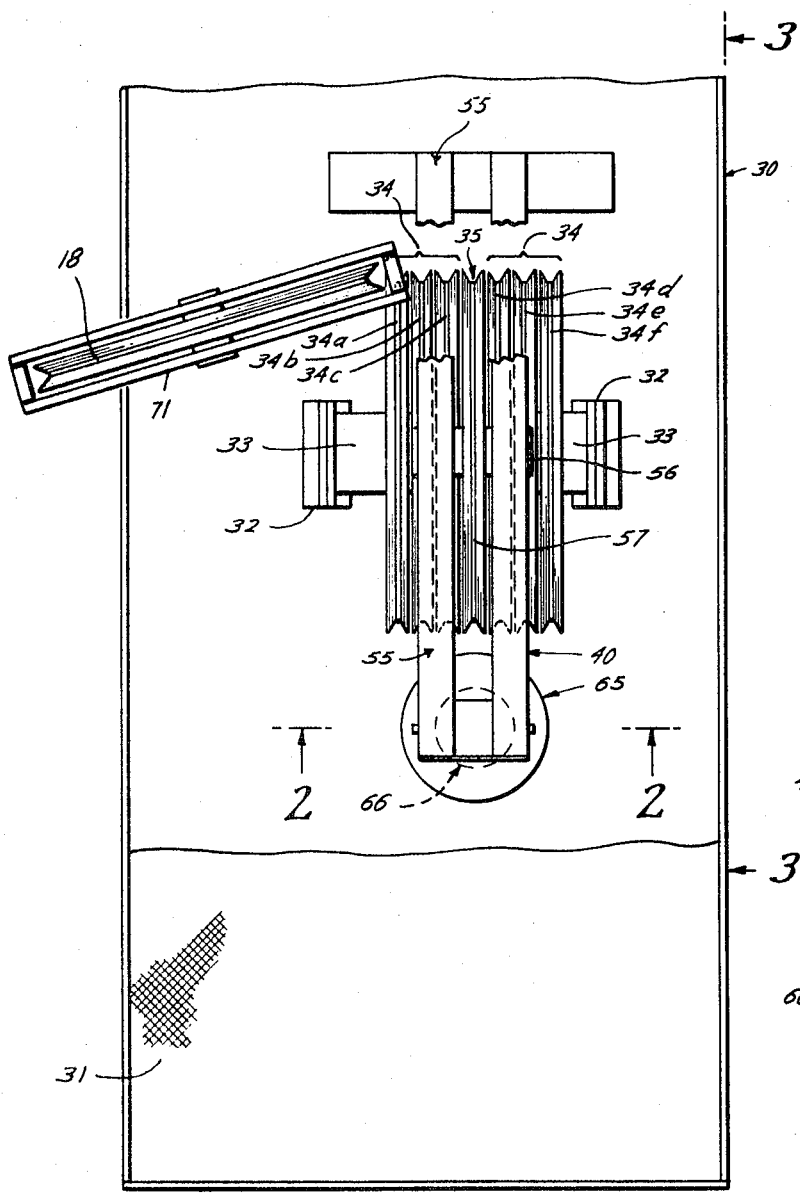

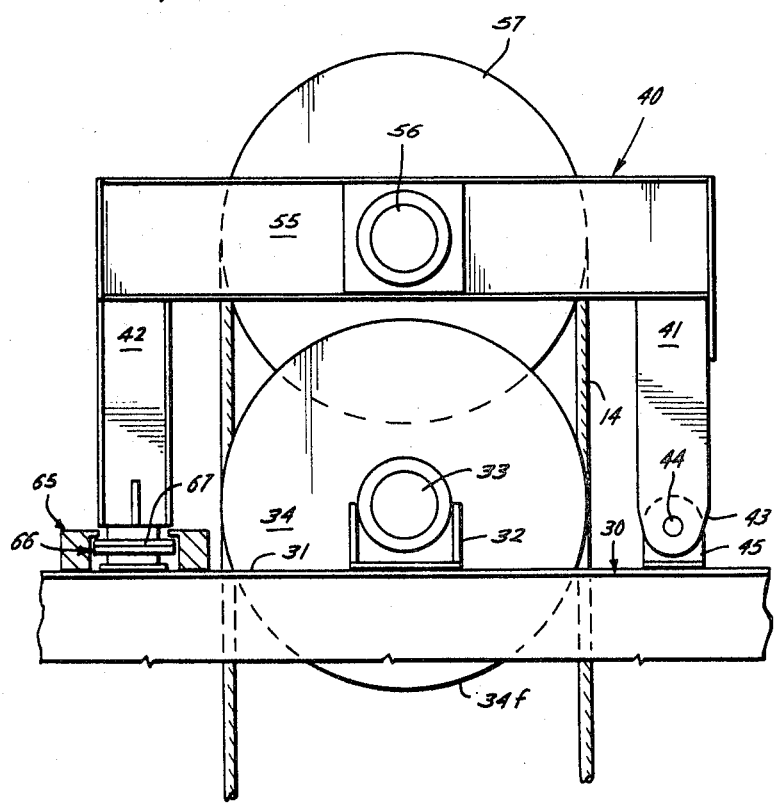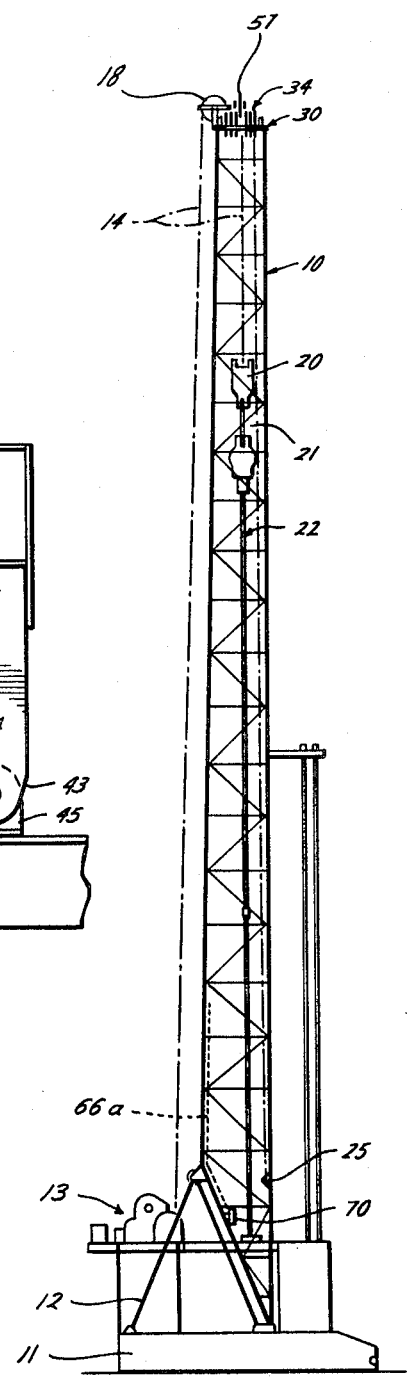

ARRANGEMENT FOR MEASURING THE LOAD ON A HOOK CARRIED BY A TRAVELING BLOCK WHICH IS SUPPORTED FROM THE CROWN BLOCK OF A DRILLING MAST

DESCRIPTION OF THE PRIOR ART

Various means have been heretofore provided in an endeavor to determine the weight supported by the hook of a drilling mast. Such arrangement entails suitable means arranged with the flexible lines connected between the crown block and traveling block of a drilling mast and hence the reading obtained by such weight indicators may be in error due to the multiple flexible line arrangement between the crown block and the traveling block.

SUMMARY OF THE PRESENT INVENTION

The present invention provides a support of novel configuration for carrying a sheave in elevated position in relation to the other sheaves of a crown block and for a novel mounting for a pressure responsive load cell so that a flexible line reeved over the elevated sheave exerts a force on the pressure responsive cell means as an indication of the load carried by a hook supported by a traveling block in a drilling mast.

Still another object of the present invention is to provide an arrangement for measuring the load carried by the hook of a drilling mast wherein clusters of sheaves are provided on a rotatable shaft in a crown block and are spaced to provide a gap adjacent the central portion thereof. A generally U-shaped frame carries an elevated sheave which extends into the gap between the clusters, the generally U-shaped frame includes a first upwardly extending frame member having its lower end pivotally mounted and a second upwardly extending frame member formed by two legs connected at their lower ends and diverging upwardly therefrom with shaft support means extending between the first and second upwardly extending frame members for carrying a sheave in elevated relation in the gap between the clusters of sheaves. A pressure responsive load cell means is mounted beneath the lower ends of the legs of the second upwardly extending frame member, and a flexible line which extends from the drawworks is reeved between the sheaves in each of the clusters as well as the elevated sheave and provides an arrangement for exerting a pressure on the pressure responsive load cell means. Such pressure is indicative of the load carried by the hook and may be transmitted by suitable means to a gauge or other instrument adjacent the drilling floor.

Still another object of the present invention is to provide an arrangement for continuously determining the load carried by a hook without incurring errors due to the flexible lines extending between the crown block and traveling block that support the hook.

Yet another object of the present invention is to provide a specific form of support for an elevated sheave in a crown block wherein a pressure responsive load cell means is mounted adjacent such support and is adapted to receive the load or force of a flexible line extending over the elevated sheave for transmitting to a suitable indicator the force applied by the line extending over such elevated sheave as an indication of the total load carried by a hook in a drilling mast.

Other objects and advantages of the present invention will become apparent from a consideration of the following description and drawings:

BRIEF DESCRIPTION OF THE DRAWINGS

FIG. 1 is a partial plan view illustrating a crown block arrangement employing the present invention;

FIG. 2 is an end elevation of the line 2—2 of FIG. 1;

FIG. 3 is a side elevation of the arrangement shown in FIG. 1; and

FIG. 4 is a diagrammatic illustration showing the utility of the present invention.

DESCRIPTION OF THE PREFERRED EMBODIMENT

Attention is first directed to FIG. 4 of the drawings wherein a drilling mast is referred to generally by the numeral 10. Such mast may be carried on a suitable substructure represented at 11 and supported in position thereon by the gin pole arrangement 12. A drawworks 13 is provided with a drum on which a flexible line 14 may be reeved. The flexible line 14 extends upwardly over a fast line sheave 18 and extends downwardly to a traveling block 20 and is then reeved between the sheaves on a first cluster in the crown block and the sheaves of the traveling block and is then reeved over an elevated sheave 57 and then reeved between the traveling block and the sheaves in the second cluster of sheaves and is then tied off at some fixed point as at 25 in the mast 10.

A hook 21 is connected to the traveling block 20 and generally supports the load of pipe extending downwardly into the well bore, such pipe being referred to generally at 22.

During drilling operations, it is desirable to know the total weight of the hook so as to not exceed safe load limits on the mast 10.

Frame means referred to generally by the numeral 30 in FIG. 1 are provided for the upper end of the drilling mast 10. Such frame means 30 may be of any suitable configuration including longitudinal and latal members to provide suitable structural support for the following described structure to be carried thereon. If desired, a suitable decking as illustrated at 31 in FIGS. 1 and 3 may be employed for providing access on top of the frame 30 and to the structure carried thereby.

Suitable bearing and support means 32 are provided on the frame 30 for receiving the rotatable shaft means 33 therebetween. Clusters 34 of sheaves are mounted on the shaft 33 in spaced relation to form a gap 35 adjacent the central portion of the shaft means 33 between the pair of clusters 34, as more clearly seen in FIGS. 1 and 4.

As shown in FIGS. 1, 2, and 3, and more particularly in FIG. 3, a generally U-shaped frame 40 is provided on the support means 30 and includes a first upwardly extending frame member generally referred to at 41 which may be of any suitable arrangement and has its lower end 43 pivotally mounted as shown at 44 in the support 45 carried on the frame 30.

A second upwardly extending frame member is better illustrated in FIG. 2 of the drawings and is shown as comprising two legs 48 and 49 which are connected at their lower ends as illustrated at 50 and which diverge from each other as they extend from their connection 50 towards their upper ends referred to generally at 48a and 49a.

Shaft support means 55 extends between and is connected to each of the first and second upwardly extending frame members 41 and 42 and as shown in FIGS. 2 and 3 of the drawings is in elevated position relative to the spaced sheave clusters 34 on shaft 33. A rotatable shaft means 56 is carried by the shaft means 55 on which is mounted a sheave 57. Thus, the sheave 57 is elevated relative to the paired sheave clusters 34 and extends into the gap 35 between the sheave clusters 34 as illustrated in FIGS. 1-4 of the drawings.

Suitable means 65, as shown in FIG. 2, are provided for limiting the vertical and lateral movement between the lower ends of the legs 48 and 49 and a load cell 66 which is carried beneath the lower ends of the legs 48 and 49. If desired, the load cell may be connected by any suitable means well known in the art to the frame 30.

The means 65 for limiting the vertical and lateral movement of the legs 48 and 49 relative to the pressure responsive load cell means 66 may be of any suitable form and may be connected with the frame 30 by any suitable means and as shown in FIG. 2 of the drawings it will be noted that a very slight clearance is provided between the member 67 connected to the lower ends of the legs 48 and 49 to inhibit lateral movement of the legs 48 and 49 relative to the pressure responsive load cell 66 therebeneath. Similarly, the means 65 are provided with an overhang 65a which inhibits or limits the upward movement of the legs 48 and 49, without restricting the downward vertical movement thereof due to pressure applied by a flexible line reeved over the sheave 57 in a manner as will be described in greater detail hereinafter.

A fast line sheave 18 is carried by a suitable frame 71 on the frame 30, the fast line sheave 18 being disposed relative to the clusters of sheaves 34 as diagrammatically illustrated in FIG. 1 of the drawings in a manner to aid in properly reeving the fast line between the crown block and traveling block.

In the use of the present invention, the flexible line 14 extending from the drum of the drawworks 13 extends upwardly over the fast line sheave 18 and thence downward to a sheave in the traveling block and then up around the first sheave 34a in one of the sheave clusters 34. It then extends down to the next sheave in the traveling block and is then reeved up over the next sheave 34b in the cluster and therearound and thence back to the traveling block sheave and then up and over the sheave 34c in the first sheave cluster 34.

The flexible line is then reeved down to the next sheave in traveling block 20 and then up over the elevated sheave 57 and then down to the next sheave in the traveling block 20 and then back and forth between the sheaves in the other cluster of sheaves in the other cluster represented by the numerals 34d, 34e, and 34f and the sheaves in the traveling block 20. Thereafter, the end of the line extends downwardly and is connected to a fixed point such as represented at 25 in the drilling mast of FIG. 4 of the drawings.

It can be appreciated that the load carried by the hook 21 is transmitted through the traveling block 20 and through the flexible lines 14 extending between the traveling block 20 and the crown block as diagrammatically illustrated in FIG. 4 of the drawings. Furthermore, the elevated sheave 57 is arranged centrally of the spaced sheave clusters 34 and the weight on the hook 21 will be transmitted through the flexible line 14 to exert a force to cause the second upwardly extending frame member 42 to be urged downwardly against the load cell 66.

The pressure responsive load cell 66 is of a well-known construction such that it functions as a transducer to convert the load in the hook into an electrical current that may be conducted through the conductor 66a to a suitable gauge or instrument 70 which may be calibrated in relation to the total number of sheaves in the sheave clusters 34 to indicate the total load on the hook 21 carried by the drilling mast.

The arrangement of the diverging legs 48 and 49 as well as the arrangement of the restraining means 65 enables the load from the hook to be transmitted to the flexible line and thence converted into a usable form in a manner so as to eliminate errors which may have heretofore occurred with ordinary weight indicators used in drilling operations.

The foregoing disclosure and description of the invention are illustrative and explanatory thereof, and various changes in the size, shape, and materials, as well as in the details of the illustrated construction may be made without departing from the spirit of the invention.

What is claimed is:

1. An arrangement for measuring the load on a hook carried by a traveling block which is suspended from the crown block of a drilling mast including:
   a. frame means for the upper end of the drilling mast;
   b. rotatable shaft means mounted on said frame means;
   c. clusters of sheaves mounted on said shaft means in spaced relation to form a gap adjacent the central portion of said shaft means between said clusters;
   d. a generally U-shaped frame on said frame means and including:
      1. a first upwardly extending frame member having its lower end pivotally supported on said frame means on one side of said sheave clusters;
      2. a second upwardly extending frame member on the other side of said sheave clusters, said second frame comprising two legs connected at their lower ends and diverging from such connection toward their upper ends;
      3. shaft support means extending between and connected to said first and second upwardly extending frame members to position said shaft support means above said sheave clusters;
      4. shaft means rotatably mounted on said shaft support means; and
      5. a sheave mounted on said last named shaft means and extending into the gap between said sheave clusters;
   e. pressure responsive load cell means mounted beneath the connection at their lower ends of said diverging legs forming said second upwardly extending frame member; and
   f. means limiting the vertical and lateral movement of said lower leg ends of said second upwardly extending frame member relative to said pressure responsive load cell means positioned therebeneath.

2. The invention of claim 1 including a fast line sheave mounted on said frame means.

3. The invention of claim 2 including a flexible line extending from a drawworks over said fast line sheave and then downwardly to the traveling block and thence back and forth between the traveling block and said sheaves in said one cluster and thence over said sheave mounted on said generally U-shaped frame member and then to the traveling block and thence back and forth between the traveling block and said sheaves in said other cluster and over the last sheave in said other cluster down to a fixed point in the drilling mast.

4. The invention of claim 3 including means connected with said pressure responsive load cell for indicating the total weight on the hook as a result of the pressure applied to said pressure responsive load by the flexible line reeved over said sheave supported on said generally U-shaped frame.

* * * * *